(12) United States Patent
Shin et al.

(10) Patent No.: US 9,955,487 B2
(45) Date of Patent: Apr. 24, 2018

(54) METHOD AND APPARATUS FOR RECEIVING DOWNLINK DATA IN WIRELESS COMMUNICATION SYSTEM

(71) Applicant: Samsung Electronics Co., Ltd., Suwon-si, Gyeonggi-do (KR)

(72) Inventors: Cheol-Kyu Shin, Suwon-si (KR); Hyo-Jin Lee, Suwon-si (KR); Heun-Chul Lee, Pocheon-si (KR); Young-Bum Kim, Seoul (KR); Youn-Sun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 14/668,212

(22) Filed: Mar. 25, 2015

(65) Prior Publication Data

US 2015/0282192 A1    Oct. 1, 2015

(30) Foreign Application Priority Data

Mar. 28, 2014 (KR) .................. 10-2014-0037108
Jun. 5, 2014 (KR) .................. 10-2014-0068437

(51) Int. Cl.
*H04W 72/08* (2009.01)
*H04L 1/00* (2006.01)
(Continued)

(52) U.S. Cl.
CPC ............. *H04W 72/082* (2013.01); *H04L 1/00* (2013.01); *H04L 5/0023* (2013.01); *H04L 5/0048* (2013.01); *H04L 27/0008* (2013.01)

(58) Field of Classification Search
CPC ...... H04W 72/082; H04L 1/00; H04L 5/0048; H04L 5/0023; H04L 27/0008
See application file for complete search history.

(56) References Cited

U.S. PATENT DOCUMENTS

2011/0158211 A1\* 6/2011 Gaal .................. H04L 25/0206
                                                        370/338
2013/0250788 A1    9/2013 Kim et al.
(Continued)

FOREIGN PATENT DOCUMENTS

KR    10-2013-0108193 A    10/2013

OTHER PUBLICATIONS

Mediatek, Inc., Discussion on the Feasibility of Network Assistance, 3GPP TSG-RAN WG1 #76, Feb. 10-14, 2014, R1-140248.
(Continued)

*Primary Examiner* — Khaled Kassim
*Assistant Examiner* — Syed S Ali
(74) *Attorney, Agent, or Firm* — Jefferson IP Law, LLP

(57) ABSTRACT

A method for receiving downlink data by a User Equipment (UE) in a wireless communication system is provided. The method includes checking a transmission parameter related to data transmitted from an interfering cell, determining presence/absence of an interference signal based on the transmission parameter, determining whether to apply Network Assisted Interference Cancellation and Suppression (NAICS) technology based on at least one of the transmission parameter or the presence/absence of the interference signal, and decoding the downlink data depending on whether to apply the NAICS technology.

20 Claims, 12 Drawing Sheets

(51) Int. Cl.
*H04L 5/00* (2006.01)
*H04L 27/00* (2006.01)

(56) References Cited

U.S. PATENT DOCUMENTS

| | | | | |
|---|---|---|---|---|
| 2014/0126404 | A1* | 5/2014 | Kim | H04L 1/00 370/252 |
| 2014/0254516 | A1* | 9/2014 | Lee | H04W 74/002 370/329 |
| 2014/0293890 | A1* | 10/2014 | Davydov | H04L 5/0085 370/329 |
| 2014/0301278 | A1* | 10/2014 | Ghosh | H04W 28/06 370/328 |
| 2016/0006521 | A1* | 1/2016 | Yoshimoto | H04W 8/24 375/267 |
| 2016/0192373 | A1* | 6/2016 | Li | H04J 11/003 370/329 |
| 2016/0219572 | A1* | 7/2016 | Oizumi | H04L 1/00 |
| 2016/0294526 | A1* | 10/2016 | Kim | H04J 11/0056 |
| 2017/0026977 | A1* | 1/2017 | Gaal | H04L 25/0206 |
| 2017/0111146 | A1* | 4/2017 | Oizumi | H04L 1/1861 |
| 2017/0311332 | A1* | 10/2017 | Hong | H04W 72/082 |
| 2017/0338917 | A1* | 11/2017 | Oizumi | H04W 72/0446 |

OTHER PUBLICATIONS

3rd Generation Partnership Project, Technical Specification Group Radio Access Network; Network-Assisted Interference Cancellation and Suppression for LTE (Release 12), Nov. 2013, pp. 1-59, 3GPP TR 36.866 V1.1.0, 3GPP, Sophia Antipolis, France.

Mediatek, Inc., Network Signaling and/or Coordination for R-ML Receivers, 3GPP TSG-RAN WG1 #74bis, Oct. 7-11, 2013, R1-134452.

Ericsson, On Network Assisted Signaling and Coordination for NAICS, 3GPP TSG-RAN WG1#76, Feb. 10-14, 2014, R1-140804.

Huawei, Hisilicon, Discussion on Network Assistance Signalling for NAICS Receivers, 3GPP TSG RAN WG1 Meeting #76, Feb. 10-14, 2014, R1-140060.

* cited by examiner

METHOD AND APPARATUS FOR RECEIVING DOWNLINK DATA IN WIRELESS COMMUNICATION SYSTEM

CROSS-REFERENCE TO RELATED APPLICATION(S)

This application claims the benefit under 35 U.S.C. § 119(a) of a Korean patent application filed on Mar. 28, 2014 in the Korean Intellectual Property Office and assigned Serial number 10-2014-0037108, and of a Korean patent application filed on Jun. 5, 2014 in the Korean Intellectual Property Office and assigned Serial number 10-2014-0068437, the entire disclosure of each of which is hereby incorporated by reference.

TECHNICAL FIELD

The present disclosure relates to a method and apparatus for receiving downlink data in a wireless communication system. More particularly, the present disclosure relates to a method and apparatus for receiving downlink data in consideration of the influence of an interference signal.

BACKGROUND

Mobile communication systems have evolved into high-speed, high-quality wireless packet data communication systems that provide data services and multimedia services, beyond providing the early voice-oriented services. Currently, a variety of mobile communication standards, such as High Speed Downlink Packet Access (HSDPA), High Speed Uplink Packet Access (HSUPA), Long Term Evolution (LTE) and Long Term Evolution Advanced (LTE-A) of $3^{rd}$ Generation Partnership Project (3GPP), High Rate Packet Data (HRPD) of $3^{rd}$ Generation Partnership Project 2 (3GPP2), and 802.16 of Institute of Electrical and Electronics Engineers (IEEE), have been developed to support high-speed, high-quality wireless packet data transmission services. In particular, the LTE system that has been developed to efficiently support transmission of high-speed wireless packet data may maximize the capacity of wireless systems by utilizing a variety of radio access technologies. The LTE-A system, an advanced wireless system of the LTE system, has an improved data transmission capability, compared with LTE.

LTE generally means a base station (or a Node B (NB) or an evolved Node B (eNB)) and terminal equipment (or User Equipment (UE), a Mobile Station (MS), a Mobile Equipment (ME), a device or a terminal) corresponding to Release 8 or 9 of the 3GPP standard group, or a communication system or communication technology including them, and LTE-A may mean a base station and terminal equipment corresponding to Release 10 of the 3GPP standard group, or a communication system or communication technology including them. Even after the standardization of the LTE-A system, the 3GPP standard group has been standardizing the next Release that is based on the LTE-A system and has improved performance.

The existing third generation (3G) and fourth generation (4G) wireless packet data communication systems such as HSDPA, HSUPA, HRPD, and LTE/LTE-A may use technologies such as an Adaptive Modulation and Coding (AMC) method and a channel-sensitive scheduling method in order to improve the transmission efficiency.

When utilizing the AMC method, a transmitter may adjust the amount of transmission data depending on the channel state. In other words, if the channel state is not good, the transmitter may reduce the amount of transmission data to match the reception error probability of a desired level, and if the channel state is good, the transmitter may increase the amount of transmission data to effectively transmit a greater amount of information, while matching the reception error probability of the desired level.

If utilizing the channel-sensitive scheduling resource management method, the transmitter may selectively service a user having a good channel state among several users, so that the system capacity may increase, compared with when the transmitter assigns a channel to one user and services the user. This capacity increase is referred to as a so-called multi-user diversity gain.

In short, the AMC method and the channel-sensitive scheduling method are methods in which the transmitter receives partial channel state information from a receiver as feedback information and applies an appropriate modulation and coding technique at the time that is determined to be most effective.

The AMC method, when used with a Multiple Input Multiple Output (MIMO) transmission scheme, may include a function of determining the number of spatial layers (or a rank) for a transmission signal. In this case, in determining the optimal data rate, the AMC method may even consider through how may spatial layers the AMC method will transmit a signal, using MIMO, without simply considering only the coding rate and the modulation scheme.

MIMO for transmitting a wireless signal using a plurality of transmit antennas may be divided into Single User MIMO (SU-MIMO) for transmitting a wireless signal to one terminal and Multi-User MIMO (MU-MIMO) for transmitting a wireless signal to a plurality of terminals using the same time-frequency resources. In the case of SU-MIMO, a plurality of transmit antennas may transmit a wireless signal to one receiver through a plurality of spatial layers. In this case, the receiver should have a plurality of receive antennas to support a plurality of spatial layers. In the case of MU-MIMO, a plurality of transmit antennas may transmit a wireless signal to a plurality of receivers through a plurality of spatial layers.

MU-MIMO, compared with SU-MIMO, has an advantage that the receiver does not require a plurality of receive antennas. However, since the transmitter transmits a wireless signal to a plurality of receivers on the same time-frequency resources, mutual interference may occur between wireless signals for different receivers.

Currently, many studies have been conducted to switch Code Division Multiple Access (CDMA) that is a multiple access scheme used in the second generation (2G) and 3G mobile communication system to Orthogonal Frequency Division Multiple Access (OFDMA) in the next-generation mobile communication system. 3GPP and 3GPP2 have begun to standardize the evolved system that uses OFDMA. It is known that an increase in the capacity may be expected in the OFDMA scheme, compared with in the CDMA scheme. One of the many causes that the OFDMA scheme enables the increase in capacity is that the OFDMA scheme may perform frequency domain scheduling. As the transmitter obtains the capacity gain using the channel-sensitive scheduling method depending on the characteristics that a channel changes over time, the transmitter may obtain more capacity gain if using the characteristics that a channel varies depending on the frequency.

FIG. 1 illustrates time-frequency resources in an LTE/LTE-A system according to the related art.

Referring to FIG. 1, the wireless resources that an eNB transmits to a UE may be divided in units of Resource Block (RB) 100 on the frequency axis, and in units of subframe 105 on the time axis. One RB may include 12 subcarriers and occupy a band of 180 kHz in the LTE/LTE-A system. One subframe may include 14 OFDM symbols and occupy a time period of 1 msec in the LTE/LTE-A system.

In performing scheduling, the LTE/LTE-A system may allocate resources in units of subframe on the time axis, and in units of RB on the frequency axis.

FIG. 2 illustrates a wireless resource of one subframe and one RB, which is a minimum unit that may be scheduled as a downlink in an LTE/LTE-A system according to the related art.

Referring to FIG. 2, a wireless resource may include one subframe on the time axis and one RB on the frequency axis. This wireless resource may include 12 subcarriers in the frequency domain and 14 OFDM symbols in the time domain, so the wireless resource may have a total of 168 unique time-frequency positions. In LTE/LTE-A, each unique time-frequency position in FIG. 2 will be referred to as a Resource Element (RE). In addition, one subframe may include two slots each having 7 OFDM symbols.

A plurality of different types of signals may be transmitted on the wireless resource shown in FIG. 2. The different types of signals may include a Cell Specific Reference Signal (CRS) 200, a Demodulation Reference Signal (DMRS) 202, a Physical Downlink Shared Channel (PDSCH) 204, a Channel Status Information Reference Signal (CSI-RS) 206 or other control channel 208.

CRS is a reference signal that is transmitted for all UEs belonging to one cell (i.e., a cell-specific signal).

DMRS is a reference signal that is transmitted for a specific UE (i.e., a UE-specific signal).

A PDSCH signal is a signal of a data channel that is transmitted on a downlink. The PDSCH signal is used by an eNB to transmit traffic to a UE, and is transmitted using an RE(s) where no reference signal is transmitted in a data rage 210 of the wireless resource.

CSI-RS is a reference signal that is transmitted for multiple user equipment (UEs) belonging to one cell, and is used to measure a channel state. A plurality of CSI-RSs may be transmitted to one cell.

The other control channel signal 208 may be a signal for providing control information that a UE requires in receiving a PDSCH, or an Acknowledgment/Negative-Acknowledgment (ACK/NACK) signal for operating Hybrid Automatic Repeat reQuest (HARQ) for data transmission of an uplink. For example, the control information may include a Physical Hybrid-ARQ Indicator Channel (PHICH), a Physical Control Format Indicator Channel (PCFICH), a Physical Downlink Control Channel (PDCCH) and/or the like.

In addition to the above signals, the LTE-A system may set muting so that CSI-RS transmitted by another eNB may be received at UEs in the cell without interference. The muting may be applied in the position where CSI-RS may be transmitted. In this case, a UE may generally receive a traffic signal by skipping the wireless resource. In the LTE-A system, muting may be referred to as another term 'zero-power CSI-RS', because muting is applied to the position of CSI-RS and no transmission power is transmitted.

Referring to FIG. 2, CSI-RS may be transmitted using some of the positions indicated by A, B, C, D, E, E, F, G, H, I and J depending on the number of antennas for transmitting CSI-RS. In addition, the muting may also be applied to some of the positions indicated by A, B, C, D, E, E, F, G, H, I and J.

In particular, CSI-RS may be transmitted on 2, 4 or 8 REs depending on the number of transmit antenna ports. If the number of antenna ports is 2, CSI-RS may be transmitted on a half of a specific pattern in FIG. 2, and if the number of antenna ports is 4, CSI-RS may be transmitted on the whole of a specific pattern. If the number of antenna ports is 8, CSI-RS may be transmitted using two patterns.

On the other hand, muting may be done in units of one pattern at all times. In other words, muting may be applied to a plurality of patterns, but if muting does not overlap CSI-RS in terms of the position, muting may not be applied only to one pattern. However, only if CSI-RS overlaps muting in terms of the position, muting may be applied only to a part of one pattern.

In a cellular system, in order to measure a downlink channel state, an eNB should transmit a reference signal. In the case of the LTE-A system, a UE may measure a channel state between the eNB and the UE, using CRS or CSI-RS transmitted by the eNB.

For the channel state, several factors should be considered basically, and the factors may include the amount of interference in a downlink. The amount of interference in a downlink may include an interference signal and a thermal noise generated by an antenna belonging to a neighboring eNB, and it is important for a UE to determine the channel status of the downlink. For example, if an eNB with one transmit antenna transmits a signal to a UE with one receive antenna, the UE should determine a Signal to Noise plus Interference Ratio (SNIR) by determining energy per symbol that the UE may receive on a downlink in the reference signal received from the eNB, and the amount of interference that is to be received at the same time in the period where the UE receives the symbol. The SNIR is a value determined by dividing the power of a received signal by the strength of a noise signal. Generally, as SNIR is higher, the UE may obtain the higher reception performance and the higher data transfer rate. The determined SNIR, the value corresponding to the SNIR or the maximum data transfer rate supportable at the SNIR may be notified to the eNB, allowing the eNB to determine at which data transfer rate it will perform downlink transmission to the UE.

In the case of the general mobile communication system, eNB equipment may be deployed at the mid-point of each cell, and the eNB equipment may perform mobile communication with the UE using one or a plurality of antennas disposed in a limited place. The mobile communication system in which antennas belonging to one cell are disposed in the same position is referred to as a Centralized Antenna System (CAS). On the other hand, the mobile communication system in which antennas (or Remote Radio Heads (RRHs)) belonging to one cell are disposed in distributed positions within the cell is referred to as a Distributed Antenna System (DAS).

FIG. 3 illustrates arrangement of antennas in distributed positions in a general distributed antenna system according to the related art.

Referring to FIG. 3, a distributed antenna system with two cells 300 and 310 is illustrated.

For example, the cell 300 may include one high-power antenna 320 and four low-power antennas (e.g., an antenna 340). The high-power antenna 320 may provide a minimum service over the entire area within the cell coverage, and the low-power antenna 340 may provide a service that is based on the high data rate, to the limited UEs in a limited area within the cell. In addition, the low-power antenna 340 and the high-power antenna 320 may both be connected to a central controller (see 330), and operate depending on the scheduling and the wireless resource allocation by the central controller. In the distributed antenna system, one or a plurality of antennas may be disposed in one geographically separated antenna position. In the distributed antenna system, an antenna or antennas disposed in the same position will be referred to as an antenna group (or RRH group) in the present disclosure.

In the distributed antenna system shown in FIG. 3, a UE may receive a signal from one geographically separated antenna group, whereas a signal transmitted from another antenna group may act as interference to the UE.

FIG. 4 illustrates an interference phenomenon that occurs when each antenna group performs transmission to different UEs in a distributed antenna system according to the related art.

Referring to FIG. 4, solid arrows represent desired (or valid) signals, and dashed arrows represent interference signals. A UE1 400 is receiving a traffic signal from an antenna group 410. However, a UE2 420 is receiving a traffic signal from an antenna group 430, a UE3 440 is receiving a traffic signal from an antenna group 450, and a UE4 460 is receiving a traffic signal from an antenna group 470. While receiving a traffic signal from the antenna group 410, the UE1 400 may receive interference signals from the other antenna groups that are transmitting traffic signals to other UEs. In other words, the signals transmitted from the antenna groups 430, 450 and 470 may generate an interference effect to the UE1 400.

In the distributed antenna system, interference generated by different antenna groups may include two types of interference (i.e., inter-cell interference and intra-cell interference). The inter-cell interference refers to interference that is generated between antenna groups of different cells, and the intra-cell interference refers to interference that is generated between (different) antenna groups of the same cell.

The intra-cell interference that the UE1 400 in FIG. 4 experiences may include interference that is generated in the antenna group 430 belonging to the same cell (i.e., a cell 1), and the inter-cell interference that the UE1 400 experiences may include interference that is generated in the antenna groups 450 and 470 of the adjacent cell (i.e., a cell 2). The inter-cell interference and the intra-cell interference may be received at the UE at the same time, interfering with reception of a data channel by the UE.

Generally, if a UE receives a wireless signal, the desired signal may be received together with noise and interference. In other words, the received signal may be expressed by the following Equation 1.

$$r = s + noise + interfernce \qquad \text{Equation 1}$$

where 'r' denotes a received signal, 's' denotes a transmission signal, 'noise' denotes a noise having a Gaussian distribution, and 'interference' denotes an interference signal generated in wireless communication.

The interference signal may be generated even in an adjacent transmission point (e.g., an adjacent cell), and even in the same transmission point (e.g., a serving cell). The interference in the adjacent transmission point refers to a case where the signal that is transmitted by an adjacent cell or an adjacent antenna in the distributed antenna system acts as interference to the desired signal. The interference in the same transmission point refers to a case where when MU-MIMO transmission is performed in one transmission point using a plurality of antennas, signals for different users cause mutual interference.

A value of SNIR varies depending on the strength of interference, resulting in an influence on the reception performance. Generally, the interference may be the most significant factor that may hinder the system performance in the cellular mobile communication system, and how to appropriately control the interference may determine the system performance.

In LTE/LTE-A, introduction of a variety of standard technologies for supporting Network Assisted Interference Cancellation and Suppression (NAICS) technology as a method capable of increasing the reception performance in the situation where interference occurs has been taken into consideration. The NAICS technology is technology in which an eNB delivers information related to an interference signal to a UE over the network and the UE recovers the received signal in consideration of the characteristics of the interference signal using the received information. For example, if the UE is aware of the modulation scheme and the reception strength for the interference signal, the UE may cancel the interference signal or recover the received signal in consideration of the interference signal, thereby improving the reception performance.

In the wireless communication system, error correction coding may be performed in order to correct errors in a transmission/reception process. In the LTE/LTE-A system, a convolutional code, a turbo code and/or the like may be used for error correction coding.

In order to increase the decoding performance of the error correction coding, a receiver may use soft decision instead of hard decision when demodulating modulation symbols that are modulated by Quadrature Phase Shift Keying (QPSK), 16 Quadrature Amplitude Modulation (16QAM) and 64QAM. If a transmitter transmits '+1' or '−1', a receiver employing hard decision may select one of '+1' or '−1' for a received signal and output the selected one. On the other hand, a receiver employing soft decision may output information about any selected one of '+1' or '−1' for a received signal, and a reliability of the decision, together. The reliability information may be utilized in improving the decoding performance in a decoding process.

What the receiver employing soft decision generally uses in calculating its output value may be a Log Likelihood Ratio (LLR). If the Binary Phase Shift Keying (BPSK) modulation scheme, in which the transmission signal is one of '+1' or '−1', is applied, LLR may be defined as follows.

$$LLR = \log \frac{f(r|s = +1)}{f(r|s = -1)} \qquad \text{Equation 2}$$

where 'r' denotes a received signal and 's' denotes a transmission signal. In addition, a conditional probability density function $f(r|s=+1)$ is a probability density function of a received signal under the condition that '+1' is transmitted as a transmission signal. Similarly, a conditional probability density function $f(r|s=-1)$ is a probability density function of a received signal under the condition that '−1' is transmitted as a transmission signal. Even for the modulation scheme such as QPSK, 16QAM and 64QAM, LLR may be expressed by an equation in a similar manner. The conditional probability density function has a Gaussian distribution in the situation where no interference exits.

FIG. 5 illustrates an example of a conditional probability density function according to the related art.

Referring to FIG. 5, a curve indicated by reference numeral 500 corresponds to a conditional probability density function f(r|s=−1), and a curve indicated by reference numeral 510 corresponds to a conditional probability density function f(r|s=+1) Using the conditional probability density function, if a received signal value is the same as a point indicated by reference numeral 520, a receiver may calculate LLR as log (f2/f1). The conditional probability density function in FIG. 5 may be assumed to be a case where the noise and interference follow a Gaussian distribution.

In the mobile communication system such as LTE/LTE-A, an eNB may deliver information of tens of bits to a UE with one transmission of PDSCH. The eNB may encode information to be transmitted to a UE, modulate the coded information by a modulation scheme such as QPSK, 16QAM and 64QAM, and transmit the modulated information. Therefore, a UE that has received PDSCH may generate LLRs for tens of coded symbols in a process of demodulating tens of modulation symbols, and deliver the generated LLRs to a decoder.

While noise follows a Gaussian distribution, interference may not follow the Gaussian distribution. The typical reason why the interference does not follow the Gaussian distribution is because the interference, unlike the noise, is a wireless signal for another receiver. In Equation 1, since 'interference' is a wireless signal for another receiver, the interference may be transmitted after the modulation scheme such as BPSK, QPSK, 16QAM and 64QAM is applied thereto. For example, if an interference signal is modulated by BPSK, the interference may have a probability distribution having a value of '+k' or '−k' as the same probability, where 'k' is a value determined by the signal strength attenuation effect of a wireless channel.

FIG. 6 illustrates a conditional probability density function in a case where it is assumed that an interference signal is also transmitted by a BPSK modulation scheme in the situation where a received signal is transmitted by the BPSK modulation scheme according to the related art.

Referring to FIG. 6, noise is assumed to follow the Gaussian distribution.

The conditional probability density function in FIG. 6 may observe a different one from that of the conditional probability density function in FIG. 5. Referring to FIG. 6, a curve indicated by reference numeral 620 corresponds to a conditional probability density function f(r|s=−1), and a curve indicated by reference numeral 630 corresponds to a conditional probability density function f(r|s=+1).

In addition, a length of an interval indicated by reference numeral 610 is determined depending on the signal strength of the interference signal, and may be determined depending on the influence of a wireless channel. Using the conditional probability density function, if a received signal value is the same as a point indicated by reference numeral 600, a receiver may calculate LLR as log (f4/f3). This value may have a different value from the LLR value in FIG. 5, because the conditional probability density function is different. In other words, the LLR determined by considering the modulation scheme of an interference signal is different from the LLR that is calculated assuming the Gaussian distribution.

FIG. 7 illustrates a conditional probability density function in a case where it is assumed that an interference signal is transmitted by a 16QAM modulation scheme in a situation where a received signal is transmitted by a BPSK modulation scheme according to the related art.

Referring to FIG. 7, a curve indicated by reference numeral 700 corresponds to a conditional probability density function f(r|s=−1), and a curve indicated by reference numeral 710 corresponds to a conditional probability density function f(r|s=+1).

FIG. 7 shows that as the modulation scheme of an interference signal is different from that of a received signal, the conditional probability density function may be different. While a received signal is transmitted by the BPSK modulation scheme in both FIGS. 6 and 7, FIG. 6 corresponds to a case where an interference signal is transmitted by the BPSK modulation scheme, and FIG. 7 corresponds to a case where an interference signal is transmitted by the 16QAM modulation scheme. In other words, it may be seen that even though the modulation scheme of a received signal is the same, the conditional probability density function may be different depending on the modulation scheme of an interference signal, and as a result, the calculated LLR may also be different.

Referring to FIGS. 5, 6, and 7, LLR may have a different value depending on how the receiver assumes interference to calculate the LLR.

In order to optimize the reception performance, it is necessary to calculate the LLR using a conditional probability density function determined by reflecting the statistical characteristics of the actual interference, or to calculate the LLR after cancelling the interference in advance. In other words, if interference is transmitted by the BPSK modulation scheme, the receiver should calculate the LLR assuming that the interference is transmitted by the BPSK modulation scheme, or calculate the LLR after cancelling the interference modulated by BPSK. If interference is transmitted by the BPSK modulation scheme, the receiver may calculate the LLR value that is not optimized, when the receiver, without performing the interference cancellation procedure, simply assumes that the interference has a Gaussian distribution or assumes that interference is transmitted by the 16QAM modulation scheme. As a result, the receiver may fail to optimize the reception performance.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for using interference-related control information to improve reception performance of a user equipment (UE) that receives a downlink in a cellular mobile communication system.

Another aspect of the present disclosure is to provide a method and apparatus for determining the presence/absence of an interference signal and using the determination results, for an effective network assisted interference cancellation and suppression (NAICS) operation in a cellular mobile communication system based on the long term evolution advanced (LTE-A) system.

In accordance with an aspect of the present disclosure, a method for receiving downlink data by a UE in a wireless communication system is provided. The method includes checking a transmission parameter related to data transmitted from an interfering cell, determining a presence/absence of an interference signal based on the transmission parameter, determining whether to apply NAICS technology based on at least one of the transmission parameter or the presence/ absence of the interference signal, and decoding the downlink data depending on whether to apply the NAICS technology.

In accordance with another aspect of the present disclosure, a UE) for receiving downlink data in a wireless communication system is provided. The UE includes a controller configured to check a transmission parameter related to data transmitted from an interfering cell, to determine a presence/absence of an interference signal based on the transmission parameter, to determine whether to apply NAICS technology based on at least one of the transmission parameter or the presence/absence of the interference signal, and to decode the downlink data depending on whether to apply the NAICS technology, and a receiver configured to receive the downlink data under control of the controller.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
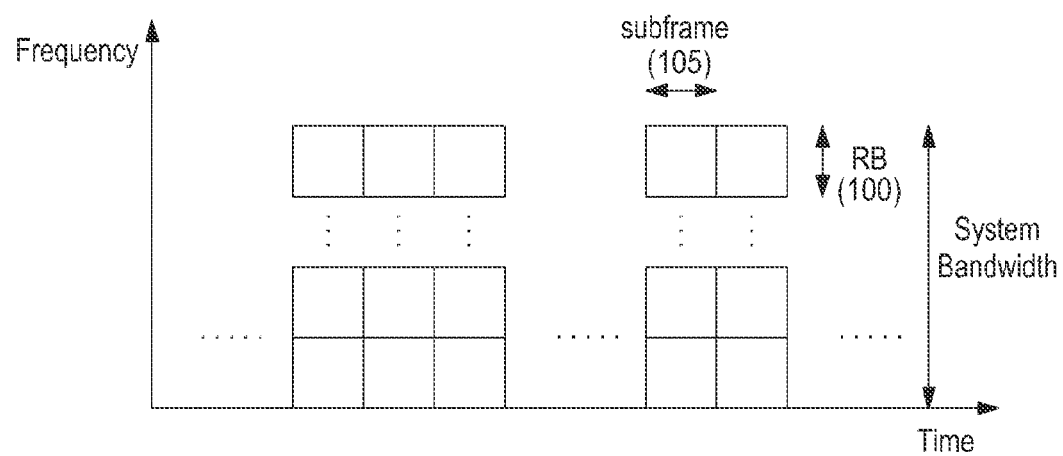
FIG. 1 illustrates time-frequency resources in an long term evolution (LTE)/long term evolution advanced (LTE-A) system according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy, limitations and other factors known to those of skill in the art, may occur in amounts that do not preclude the effect the characteristic was intended to provide.

Although the environment of the orthogonal frequency division multiple access (OFDM)-based wireless communication system, especially the $3^{rd}$ generation partnership project (3GPP) Evolved Universal Terrestrial Radio Access (EUTRA) system, will be mainly considered in a detailed description of various embodiments of the present disclosure, it will be apparent to those of ordinary skill in the art that the major subject matter of the present disclosure may be applied to any other communication systems having the similar technical background and channel types with slight modification, without departing from the scope of the present disclosure.

Prior to a detailed description of the present disclosure, examples of interpretable meanings of some terms used herein will be presented. However, it should be noted that the terms are not limited to these examples presented below.

A base station, an entity that communicates with a terminal, may refer to Base Station (BS), Node B (NB), eNode B (eNB), Access Point (AP) and/or the like.

A terminal, an entity that communicates with a base station, may refer to User Equipment (UE), Mobile Station (MS), Mobile Equipment (ME), device, terminal and/or the like.

Figure 8:
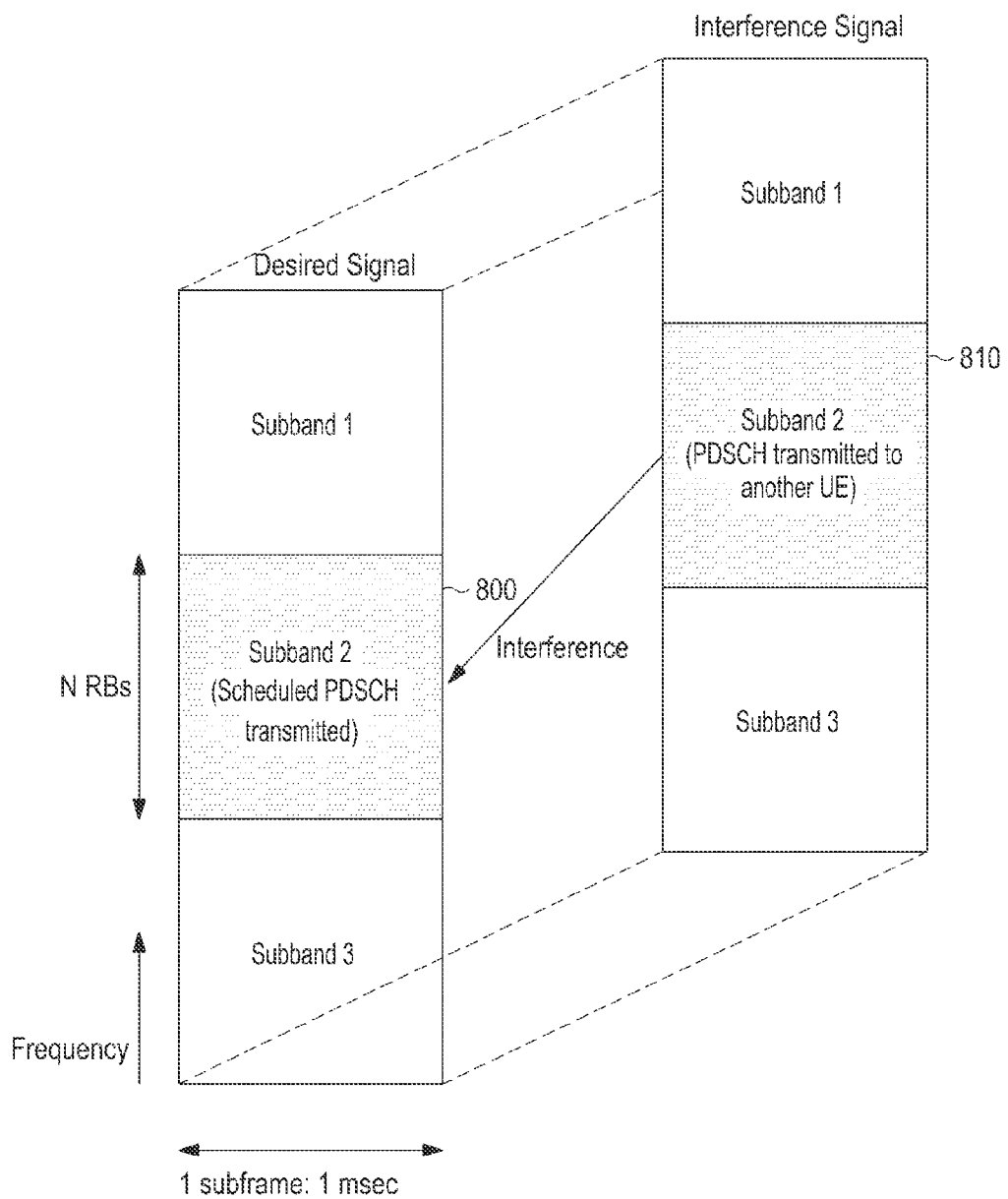
FIG. 8 illustrates occurrence of interference in an LTE/LTE-A system according to an embodiment of the present disclosure.

FIG. 8 illustrates occurrence of interference in a long term evolution (LTE)/long term evolution advanced (LTE-A) system according to an embodiment of the present disclosure.

Referring to FIG. 8, a UE desires to receive a wireless signal 800. The wireless signal 800 may be referred to as a 'desired signal', since the wireless signal 800 is a signal that the UE desires to receive. An interference signal 810 that is transmitted to other UEs may cause interference to the UE. In the case of the LTE/LTE-A system, if the desired signal 800 and the interference signal 810 are transmitted in the same frequency range of the same subframe, the interference may occur. Referring to FIG. 8, it is assumed that the signal 800 that the UE desires to receive and the interference signal 810 are transmitted on N RBs.

In the present disclosure, methods for supporting Network Assisted Interference Cancellation and Suppression (NA-ICS) technology that is a method capable of increasing the reception performance of a UE by cancelling or suppressing interference in the LTE/LTE-A system will be taken into consideration. The NAICS technology is technology in which an eNB delivers information related to an interference signal to a UE over a network, so the UE may recover a received signal in consideration of the characteristics of the interference signal. For example, if a UE is aware of the modulation scheme or the reception strength for the interference signal, the UE may cancel the interference signal or recover the received signal in consideration of the interference signal, thereby improving the reception performance. Alternatively, the UE may determine whether to perform NAICS in a process of recovering the received signal. If the UE determines to apply NAICS, the UE may perform NAICS for an interference signal, and then perform decoding for PDSCH. If the UE determines not to apply NAICS, the UE may perform decoding for PDSCH in the same manner as that of the existing UE (without performing NAICS).

Figure 9:
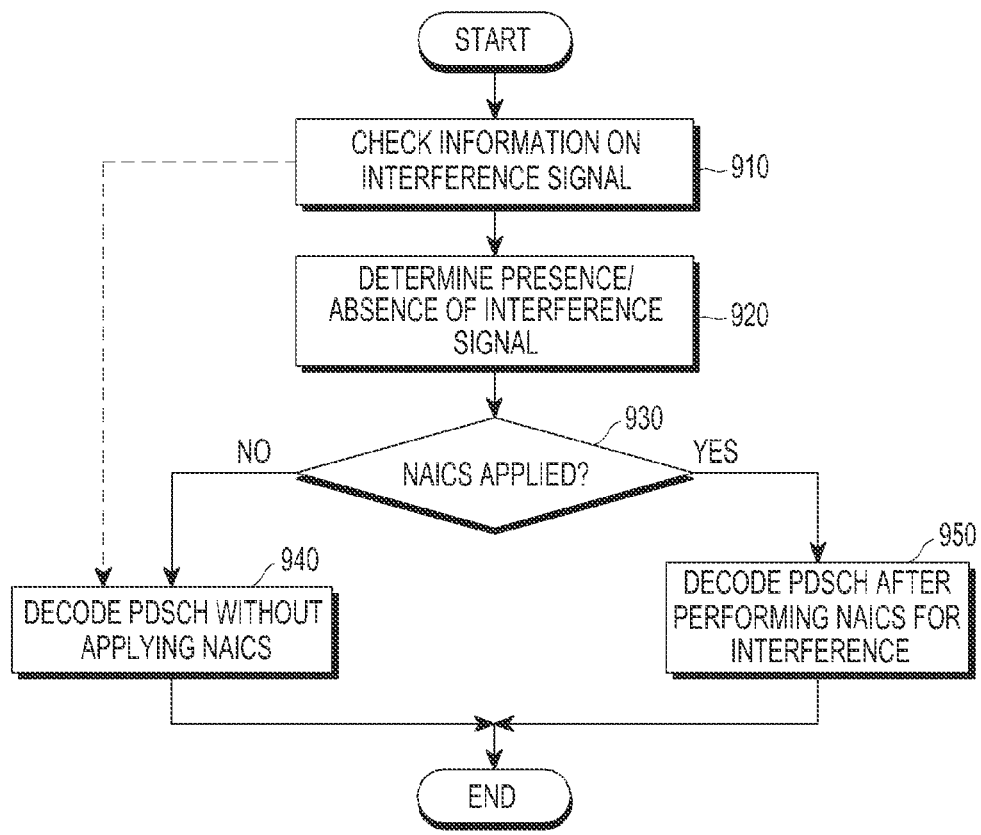
FIG. 9 illustrates a method for receiving downlink data in a UE according to an embodiment of the present disclosure.

FIG. 9 illustrates a method for receiving downlink data using NAICS by a UE according to an embodiment of the present disclosure.

Referring to FIG. 9, in operation 910, a UE may start a process of checking information about an interference signal. In order to cancel the interference signal 810 or derive the probability density function in which the statistical characteristics of the interference signal 810 are reflected, the UE should be aware of at least one of the modulation scheme of the interference signal and the reception strength of the interference signal. In other words, in the case of the LTE/LTE-A system, in order to determine the modulation scheme of the interference signal and the reception strength of the interference signal, the UE should be able to determine at least one of the transmission parameters for interference as shown in Table 1.

TABLE 1

| Transmission parameters for interference | Detailed transmission parameters |
|---|---|
| CRS information of interfering cell | Cell identifier (cell ID) |
|  | The number of CRS antenna ports |
|  | Multicast-Broadcast Single Frequency Network (MBSFN) subframe information |
|  | data RE to CRS energy per resource element (EPRE) ratio: $P_A$ (UE-specific parameter provided by upper layer), $P_B$ (cell-specific parameter provided by upper layer) [see 3GPP TS 36.213 Section 5.2] |
| CSI-RS information of interfering cell | CSI-RS information of interfering cell: the number of CRS-RS antenna ports, and the like |
| Network deployment information of | Inter-eNB synchronization information |
|  | Cyclic prefix information |

TABLE 1-continued

| Transmission parameters for interference | Detailed transmission parameters |
|---|---|
| interfering cell | Slot number information |
|  | Uplink/downlink configuration information |
| enhanced PDCCH (ePDCCH) information of interfering cell | ePDCCH information of interfering cell |
| Transmission mode (TM) of interference PDSCH | TM of interference PDSCH |
| Interference PDSCH-related dynamic transmission information | Modulation order |
|  | Rank Indicator (RI): information about the number of transmission streams of interference PDSCH |
|  | Precoding-Matrix Indicator (PMI): Precoding information of interference PDSCH |
|  | DMRSI information (DMRSI): DMRS antenna port information (DMRS-AP), DMRS sequence information (e.g., virtual cell ID, scrambling ID) |
|  | Control Format Indicator (CFI) information: PCFICH, PDCCH, PHICH |
| Scheduling information of interference PDSCH | Resource Allocation (RA) granularity |
|  | RA type |

In the LTE/LTE-A system, among the transmission parameters for interference, parameter values possible as TM of interference PDSCH are TM1 to TM10. A PDSCH transmission method for each transmission mode is disclosed in detail in 3GPP Technical Specification (TS) 36.213, so a detailed description thereof will be omitted.

Some of the transmission parameters for interference may be delivered from an eNB to a UE by separate signaling, and the other some transmission parameters may be directly detected by a UE that uses blind detection. After checking the information about an interference signal in operation 910, the UE may perform an additional operation for determining whether to apply NAICS. The additional operation will be described in more detail with reference to FIG. 10.

In operation 920, the UE may assume the checked information about an interference signal, and then perform a process of determining the presence/absence of an interference signal.

The information about the presence/absence of interference may be signaled over a control channel. As for the signaling method over a control channel, a method of adding bit information for NAICS to a Downlink Control Information (DCI) format corresponding to all TMs defined in the LTE/LTE-A system may be taken into consideration. For example, the presence/absence of interference may be signaled by adding only 1-bit information to the existing DCI format. This method is advantageous in that it is not necessary to separately define additional TM and DCI format for NAICS, or to cause NAICS to additionally use control information for supporting all of CRS-based TM and DMRS-based TM.

The method of using a control channel for signaling of the presence/absence of interference may be utilized even for signaling for applying/non-applying of NAICS in operation 910. If there is no signaling for the presence/absence of interference, the UE may check the presence/absence of an interference signal in a process of estimating a channel using a Reference Signal (RS) of interference PDSCH.

In operation 930, the UE may determine whether to apply NAICS to a received signal. Depending on the determination, the UE may perform decoding on PDSCH without applying NAICS in operation 940, or perform PDSCH decoding after performing NAICS for interference in operation 950. In order to increase the reception performance in a process of detecting a signal that the UE desires to receive, the UE should calculate LLR after canceling an interference signal by applying NAICS in operation 950, or should calculate LLR after exactly calculating a conditional probability density function in which statistical characters of an interference signal are reflected. However, if it is determined in operation 920 that there is no interference, the UE may perform decoding on PDSCH without applying NAICS in operation 940.

If an operation of determining whether to apply NAICS is added in operation 910, and it is determined not to apply NAICS, the UE may directly proceed to operation 940 without performing operations 920 and 930.

Figure 10:
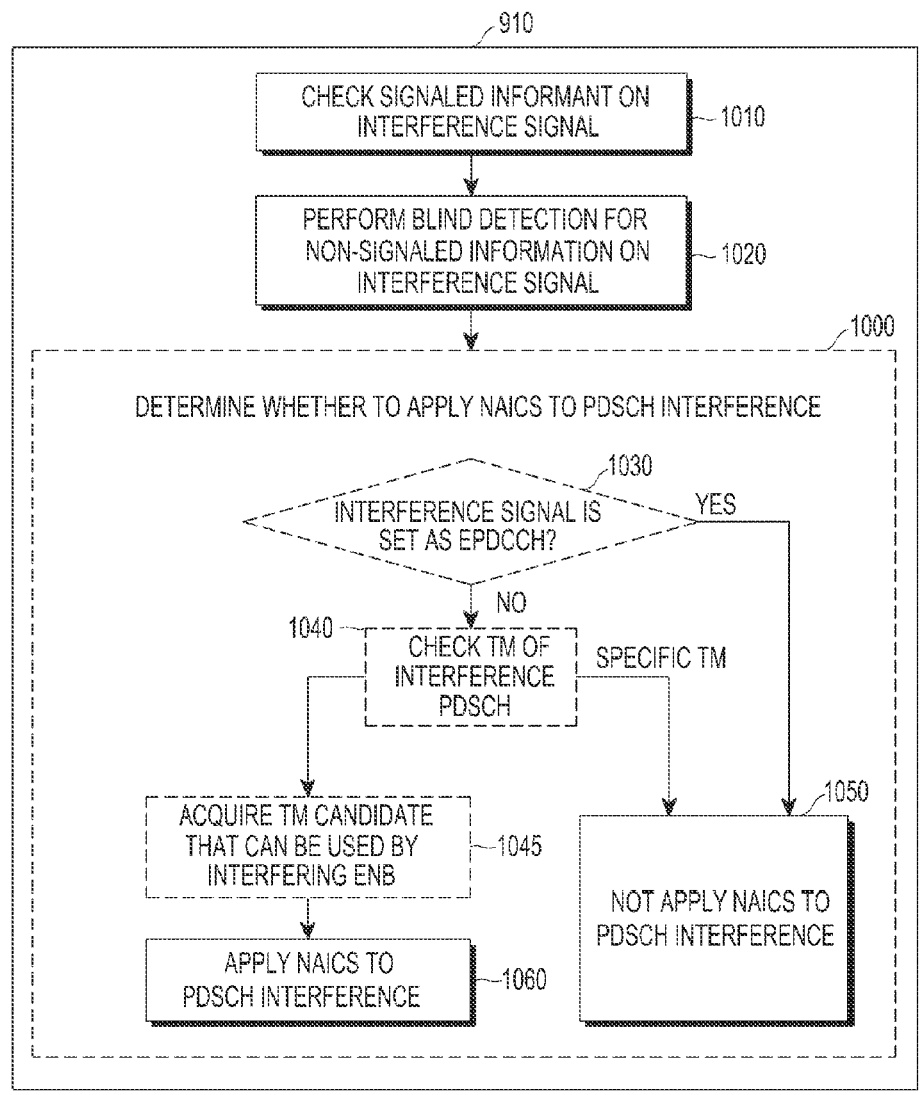
FIG. 10 illustrates a detailed operation of checking information about an interference signal by a UE according to an embodiment of the present disclosure.

FIG. 10 illustrates a detailed operation of checking information about an interference signal by a UE according to an embodiment of the present disclosure, and a process of determining whether to apply NAICS to PDSCH interference with an additional operation that is possible in the process.

Referring to FIG. 10, in operation 910 a process 1000 of determining whether to apply NAICS, an operation 1050 in which the UE determines not to apply NAICS to the PDSCH interference is to improve the reception performance of the UE that uses NAICS. In other words, if a control channel of an interference signal is set as ePDCCH, or in the case of a particular TM where real-time signaling of information about RS is impossible, NAICS does not exert the effects, so the performance of the NAICS method may be improved by not performing NAICS.

Referring to FIG. 10, operations that may be optionally added are shown by a dotted line. Therefore, the blocks shown by the dotted line may be omitted.

In operation 1010, the UE may check the signaled information about an interference signal.

For example, an eNB may provide the information about an interference signal to the UE through signaling of its Radio Resource Control (RRC) layer, or through direct indication. The direct indication refers to a scheme in which each time the eNB transmits a signal carrying control information to the UE on a control channel such as PDCCH, the eNB indicates or provides the interference information.

In operation 1020, the UE may check information about an interference signal, which has not been signaled, by performing blind detection on the information. In addition, for a particular transmission parameter, the eNB may signal a candidate set of possible values that the parameter may have, to the UE, and the UE may detect a transmission parameter value of an interference signal from the candidates of the received possible parameter values, using blind detection.

In the present disclosure, the UE may determine whether to apply NAICS to PDSCH interference, assuming that the UE checks the signaled information about an interference signal in operation 1010 with respect to all the transmission parameters for interference or the UE already has determined the signaled information through blind detection in operation 1020.

When applying NAICS to an interference signal, UEs that operate by calculating the LLR determined by considering interference cancellation or interference may obtain a performance gain. However, in some cases, depending on the interference signal, it is difficult to ensure the performance of NAICS. For example, if a control channel of an interference signal is set as ePDCCH, a control channel may be assigned in a UE-specific manner and the control channel assigned to the UE may be randomly changed over time, so it is not possible to ensure the performance of NAICS for the control channel that is randomly changed. As another example, if the transmission mode of interference PDSCH is set as TM7, for an antenna port of p=5, RS is determined as a function of Radio-Network Temporary Identifier (RNTI) for the UE, so it is difficult to continuously signal information about the RS, making it difficult to ensure the performance of NAICS.

Therefore, the present disclosure provides a method of determining whether to apply NAICS to PDSCH interference in a process of checking information about an interference signal.

If the UE determines in operation 1030 that the interference signal is set as ePDCCH, the UE may determine not to apply NAICS to the PDSCH interference in operation 1050.

If the UE determines in operation 1030 that the interference signal is not set as ePDCCH, the UE may check the transmission mode of interference PDSCH in operation 1040. Specifically, the UE may determine whether TM of the interference PDSCH is a specific TM (e.g., TM7), CRS-based TM, or DMRS-based TM.

If TM of the interference PDSCH is set as a specific TM (e.g., TM7), the UE may determine not to apply NAICS to interference of the interference PDSCH in operation 1050. The specific TM may not be limited to TM7, and may be applied to other TMs. For example, TM5 may also be classified as the specific TM. In other words, even in the case of TM5, the UE may determine not to apply NAICS.

If TM of interference PDSCH is another TM other than the specific TM, the UE may determine to apply NAICS to interference of the interference PDSCH in operation 1060. In operation 1045, the UE may obtain TM candidates that may be used by an interfering eNB. Specifically, if TM of interference PDSCH is TM1 to TM5 in which the UE operates based on CRS, the UE may determine the interference PDSCH signal as CRS-based TM, and if TM of interference PDSCH is TM8 to TM10 in which the UE operates based on DMRS, the UE may determine the interference PDSCH signal as DMRS-based TM.

The operation 1000 in which the UE determines whether to apply NAICS to interference of the interference PDSCH is not limited to the example of operation 1030 and operation 1040, and may be applied to various other examples through additional setting of information about an interference signal, to ensure the performance of NAICS. These various other examples may include an example of using the number of CSI-RS antenna ports as CSI-RS related information of an interfering cell in determining whether to apply NAICS. More specifically, the UE may be configured to apply NAICS, only if the number of CSI-RS antenna ports is 1 or 2.

Figure 11A:
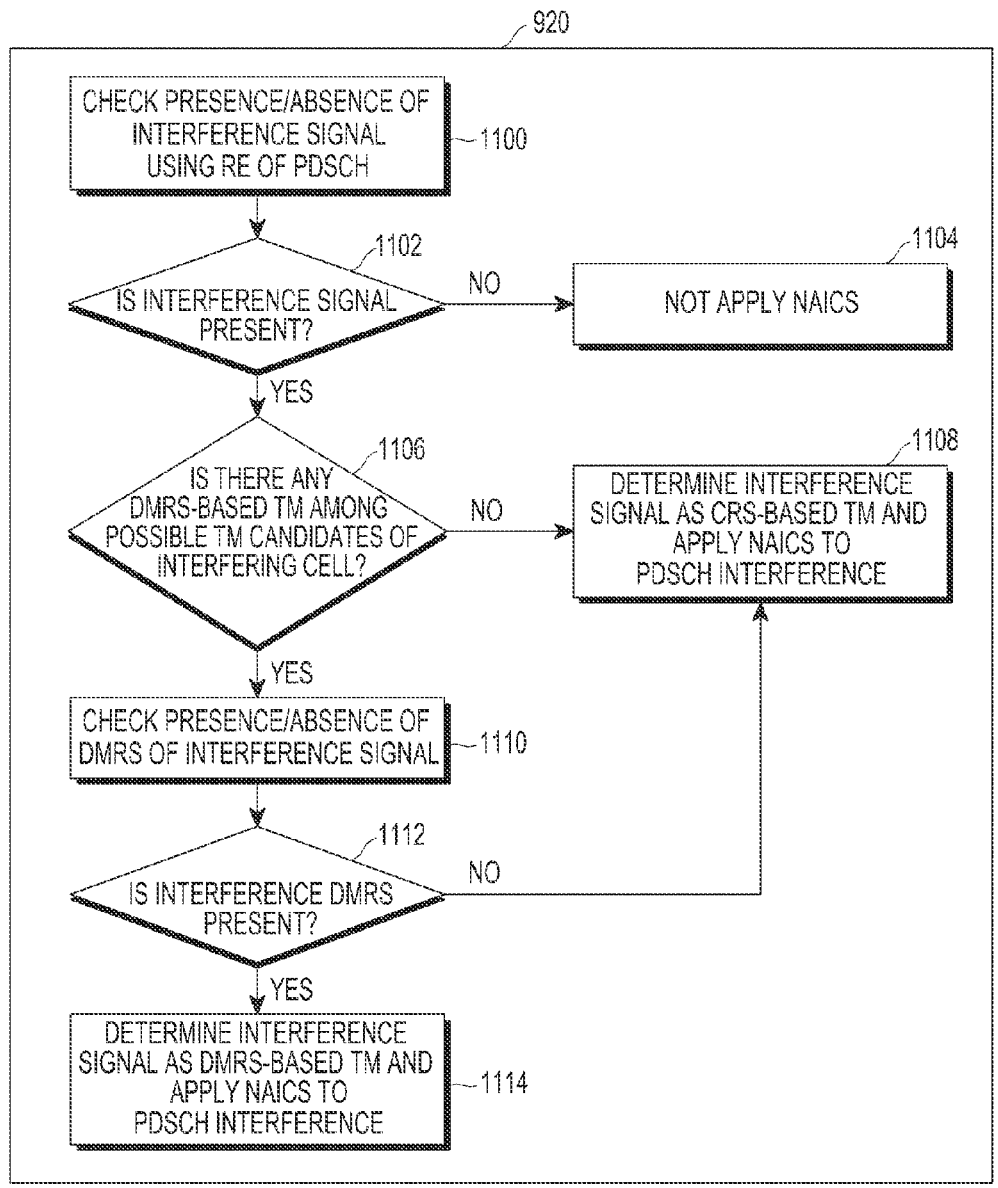
FIGS. 11A and 11B illustrate detailed method for determining a presence/absence of an interference signal by a UE according to an embodiment of the present disclosure.
Figure 11B:
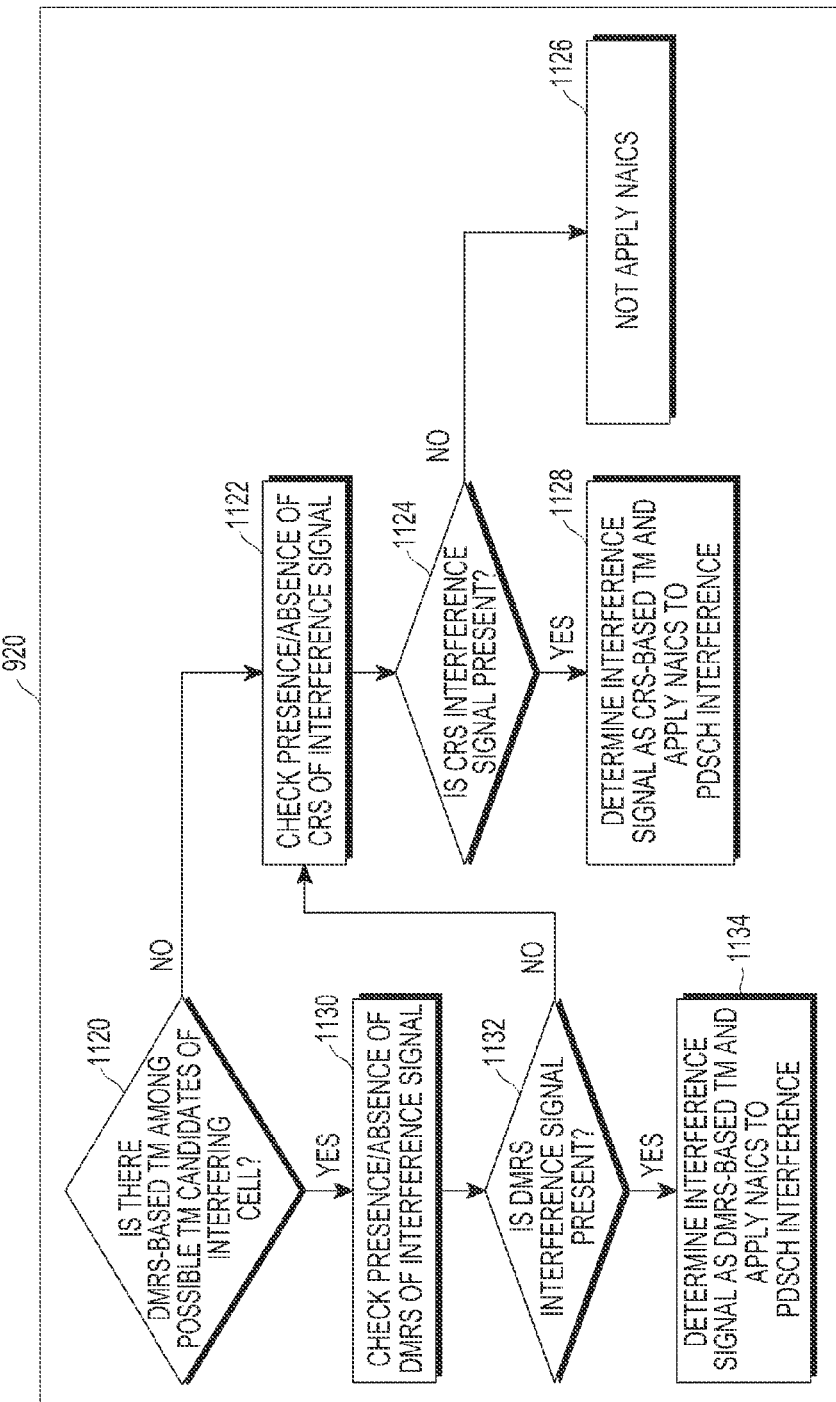

FIGS. 11A and 11B illustrate two detailed examples of a process of determining a present/absence of an interference signal by a UE according to an embodiment of the present disclosure.

A first method of determining the presence/absence of an interference signal will be described with reference to FIG. 11A.

Referring to FIG. 11A, in operation 920 in FIG. 9, the UE should determine not only the presence/absence of interference but also the type of an RS used for interference, to effectively apply NAICS to a PDSCH data region.

In operation 1100, the UE may check the presence/absence of an interference signal using a Resource Element (RE) of PDSCH. For example, the UE may more accurately check the presence/absence of interference, if the UE uses RE in an RS region together with the information about an RS. However, in the case of a Multicast-Broadcast Single Frequency Network (MBSFN) subframe, the UE may not use the RE in an RS region since CRS is not transmitted in the PDSCH region. Therefore, the RE that is used for determining the presence/absence of an interference signal may be differently determined depending on the implementation.

In operation 1102, the UE may determine whether an interference signal is present.

If it is determined in operation 1102 that no interference signal is present, the UE may not apply NAICS in operation 1104.

If it is determined in operation 1102 that an interference signal is present, the UE may determine in operation 1106 whether there is DMRS-based TM among TM candidates, based on the TM candidates that are obtained in operation 1045 in FIG. 10 and may be used by an interfering eNB.

If it is determined in operation 1106 that there is no DMRS-based TM candidate, the UE may determine the interference signal as a CRS-based TM and apply NAICS to the PDSCH interference in operation 1108.

If it is determined in operation 1106 that there is a DMRS-based TM candidate, a procedure for accurately determining whether RS of the interference signal is based on DMRS or CRS, is required. In operation 1110, the UE may check whether RS of the interference signal is based on DMRS, by checking whether DMRS is present or not in the interference signal. Operation 1110 will be described in more detail in FIG. 12.

In operation 1112, the UE may determine whether DMRS is present in the interference signal.

If it is determined in operation 1112 that an interference DMRS signal is present, the UE may determine the interference signal as DMRS-based TM, and apply NAICS to the PDSCH interference in operation 1114.

If it is determined in operation 1112 that no interference DMRS signal is present, the UE may determine the interference signal as CRS-based TM, and apply NAICS to the PDSCH interference in operation 1108.

For a better understanding, in FIG. 11A, operation 1100 of checking the presence/absence of a PDSCH interference signal and operation 1102 of determining the presence/absence of interference are separately shown and described, and operation 1110 of checking the presence/absence of DMRS of an interference signal and operation 1112 of determining the presence/absence of interference DMRS are separately shown and described. Obviously, however, operations 1100 and 1102 (or operations 1110 and 1112) may be implemented as one operation. In other words, by undergoing operations 1100 and 1110, the UE may automatically perform operations 1102 and 1112.

A second method of determining the presence/absence of an interference signal will be described with reference to FIG. 11B.

The second method illustrated in FIG. 11B may determine the presence/absence of an interference signal more effectively, compared with the first method in FIG. 1.

As mentioned above, the UE may determine the presence/absence of interference more accurately if the UE uses RE in an RS region together with information about an RS when checking the presence/absence of an interference signal. Therefore, in the second method, the UE may determine the presence/absence of interference more accurately, by first checking the presence absence of RS (e.g., any one of DMRS and CRS) of an interference signal.

Referring to FIG. 11B, in operation 1120, the UE may determine whether there is DMRS-based TM among TM candidates, based on the TM candidates that are obtained in operation 1045 in FIG. 10 and may be used by an interfering eNB.

If it is determined in operation 1120 that there is DMRS-based TM, the UE may check the presence/absence of DMRS of an interference signal in operation 1130.

In operation 1132, the UE may determine whether interference DMRS is present.

If it is determined in operation 1132 that interference DMRS is present, the UE may determine the interference signal as DMRS-based TM and apply NAICS to the PDSCH interference in operation 1134.

If it is determined in operation 1132 that no interference DMRS is present, the UE may check the presence/absence of a CRS-based interference signal in operation 1122.

Optionally, the UE may further perform a process of determining whether there is CRS TM among the TM candidates that are obtained in operation 1045 and may be used by an interfering eNB. If it is determined that there is no CRS TM and there is only DMRS TM among the TM candidates that may be used by an interfering eNB, the UE may determine not to apply NAICS and end the operation 920 in operation 1126. However, if it is determined that there is a CRS-based TM candidate among the TM candidates that are obtained in operation 1045 and may be used by an interfering eNB, the UE may check the presence/absence of CRS-based interference signal in operation 1122.

In operation 1124, the UE may determine whether a CRS-based interference signal is present.

If it is determined in operation 1124 that no CRS-based interference signal is present, the UE may not apply NAICS in operation 1126.

If it is determined in operation 1124 that a CRS-based interference signal is present, the UE may determine the interference signal as CRS-based TM and apply NAICS to the PDSCH interference in operation 1128.

It may be noted herein that the second method illustrated in FIG. 11B, compared with the first method in FIG. 11A, may determine the presence/absence of an interference signal more accurately and have the lower complexity, for the following reasons. For example, if it is determined in operation 1120 that there is only DMRS-based TM, it is possible to determine the presence/absence of an interference signal by checking the presence/absence of DMRS of an interference signal in operation 1130, and if it is determined in operation 1120 that there is no DMRS-based TM, it is possible to end operation 920 by checking the presence/absence of an interference signal in operation 1122.

For a better understanding, in FIG. 11B, operation 1130 of checking the presence/absence of DMRS of an interference signal and operation 1132 of determining the presence/absence of interference DMRS are separately shown and described, and operation 1122 of checking the presence/absence of CRS of an interference signal and operation 1124 of determining the presence/absence of an interference signal are separately shown and described. Obviously, however, operations 1130 and 1132 (or operations 1122 and 1124) may be implemented as one operation. In other words, by undergoing operations 1130 and 1122, the UE may automatically perform operations 1132 and 1124.

If it is determined in operation 1132 that no interference DMRS is present, the UE may check the present/absence of a CRS-based PDSCH interference signal in consideration of the situation where DCI forma is fallen back, in operation 1122.

If the information about TM of interference PDSCH has not been signaled in operation 910, the UE should determine, in operation 920, the presence/absence of an interference signal without performing operation 1120 of determining TM of interference PDSCH.

In this case, the UE may check the presence/absence of a DMRS-based interference signal directly (i.e., without performing operation 1120) in operation 1130. If no DMRS-based interference signal is present, the UE may check the presence/absence of a CRS-based interference signal in operation 1122, thereby performing operation 920.

The present disclosure proposes a method in which if signaling for the presence/absence of interference is not additionally done, the UE may effectively check the presence/absence of a DMRS-based PDSCH interference signal.

Figure 2:
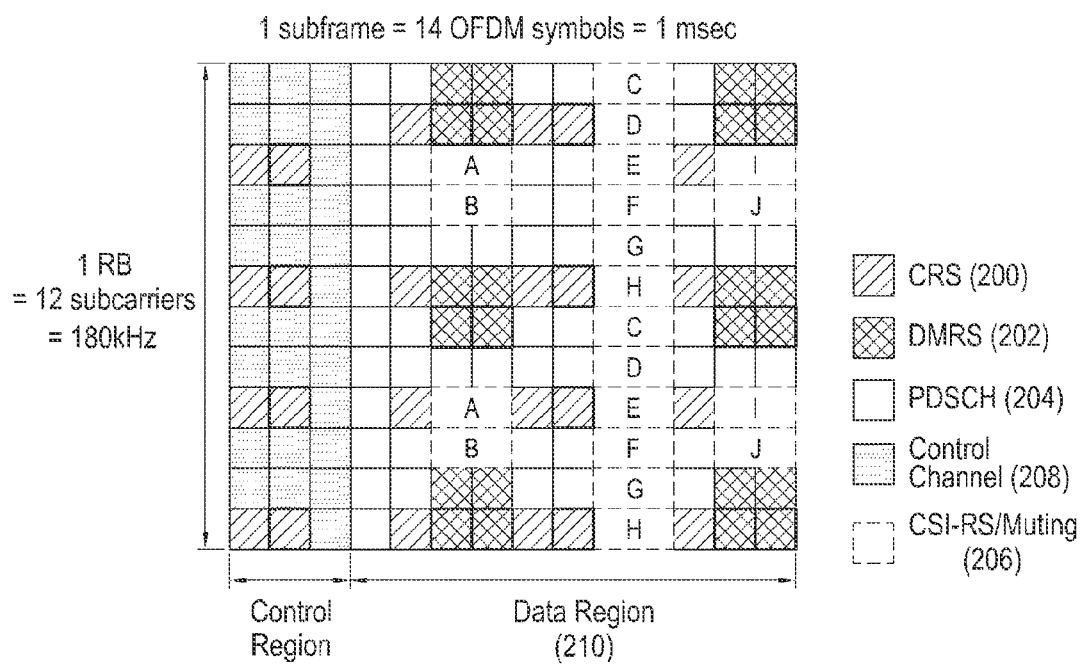
FIG. 2 illustrates a wireless resource of one subframe and one resource block (RB), which is a minimum unit that may be scheduled as a downlink in an LTE/LTE-A system according to the related art.
Figure 3:
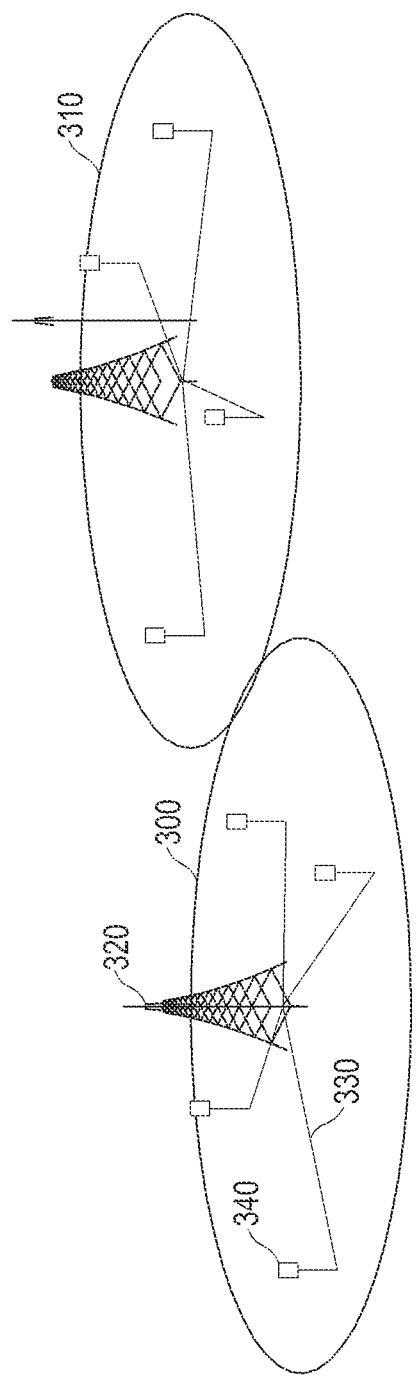
FIG. 3 illustrates arrangement of antennas in distributed positions in a general distributed antenna system according to the related art.
Figure 4:
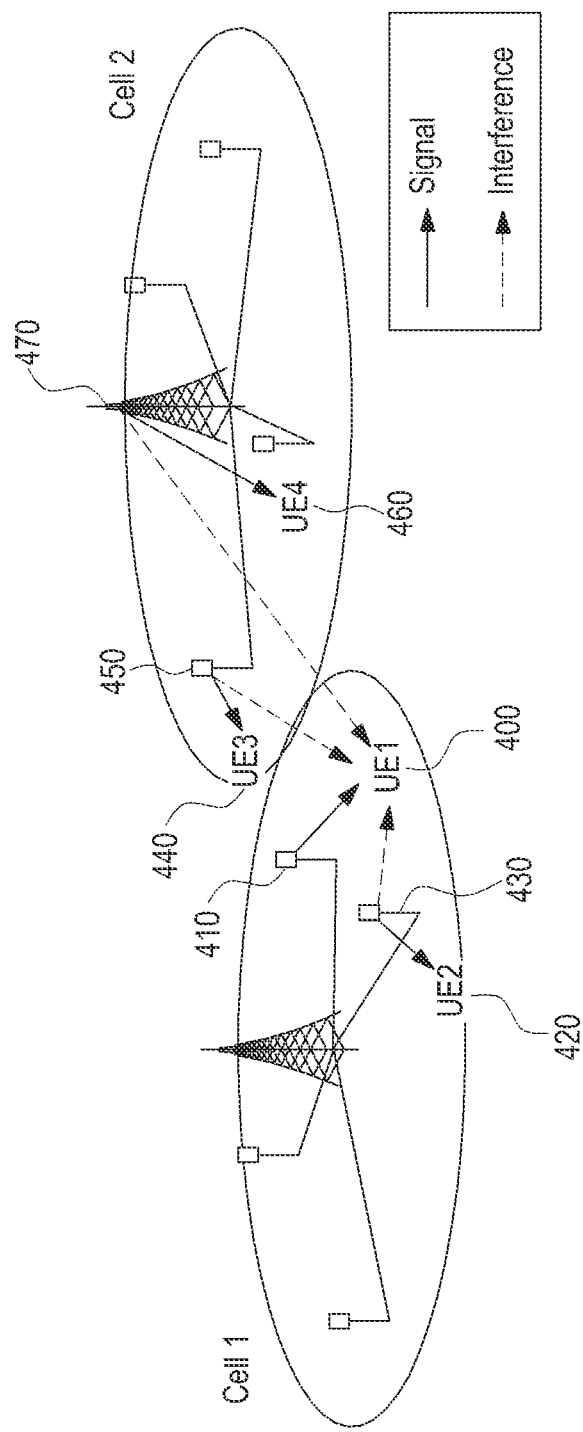
FIG. 4 illustrates an interference phenomenon that occurs when each antenna group performs transmission to different multiple user equipment (UEs) in a distributed antenna system according to the related art.
Figure 5:
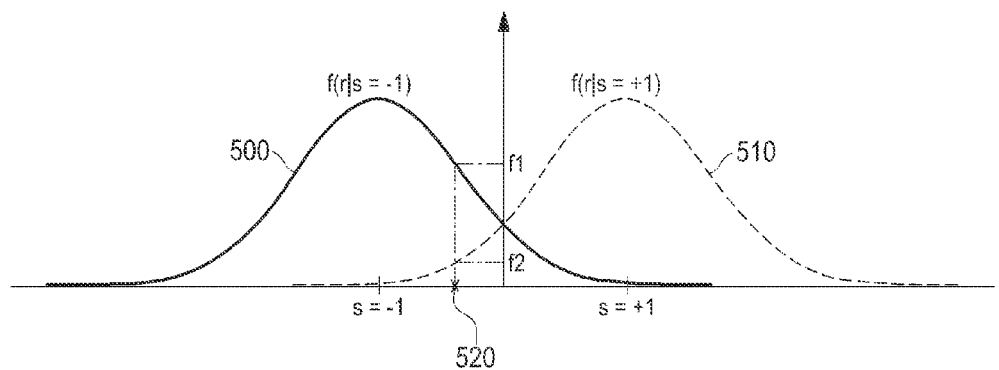
FIG. 5 illustrates an example of a conditional probability density function according to the related art.
Figure 6:
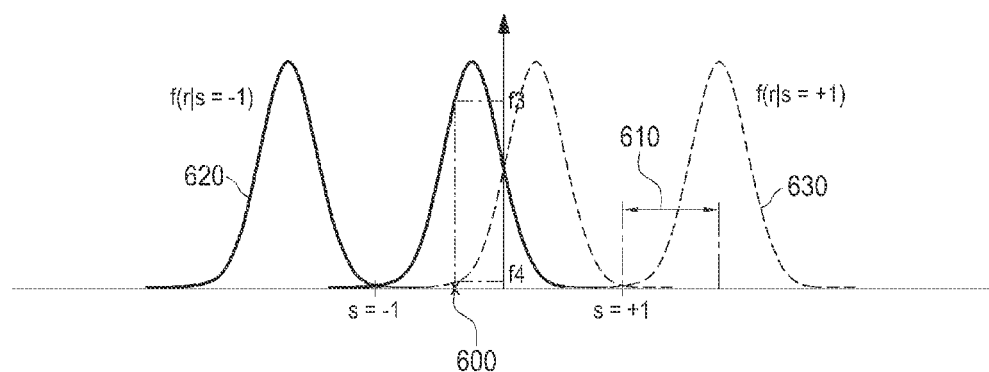
FIG. 6 illustrates another example of a conditional probability density function according to the related art.
Figure 7:
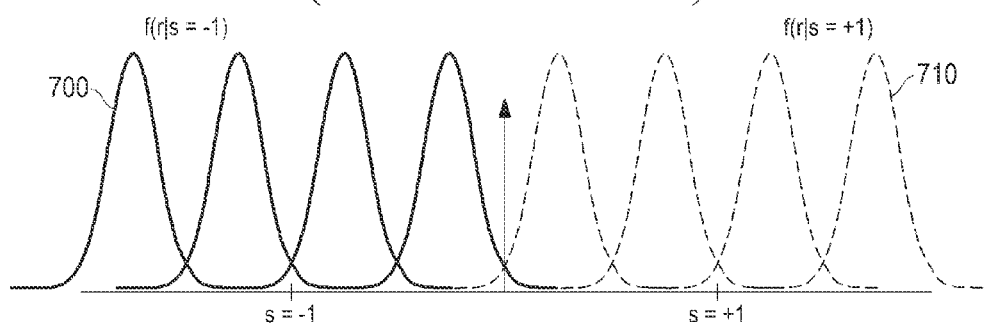
FIG. 7 illustrates another example of a conditional probability density function according to the related art.

In LTE/LTE-A, the position of DMRS in an RB is as illustrated in FIG. 2. If TM of interference PDSCH corresponds to TM8 to TM10 in which the UE operates based on DMRS, DMRS may be allocated to an antenna port of p=7, p=8, or p=7, 8, etc., v+6, where 'v' denotes a rank, or the number of spatial layers. In the case of TM8, up to two layers may be supported, and in the case of TM9 and TM10, up to 8 layers may be supported.

In order to effectively allocate RSs of multiple antennas in the limited DMRS positions in FIG. 2, an Orthogonal Cover Code (OCC) as shown in Table 2 may be used. An OCC applying method for each antenna port is disclosed in detail in 3GPP TS 36.211, so a detailed description thereof will be omitted.

TABLE 2

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Figure 12:
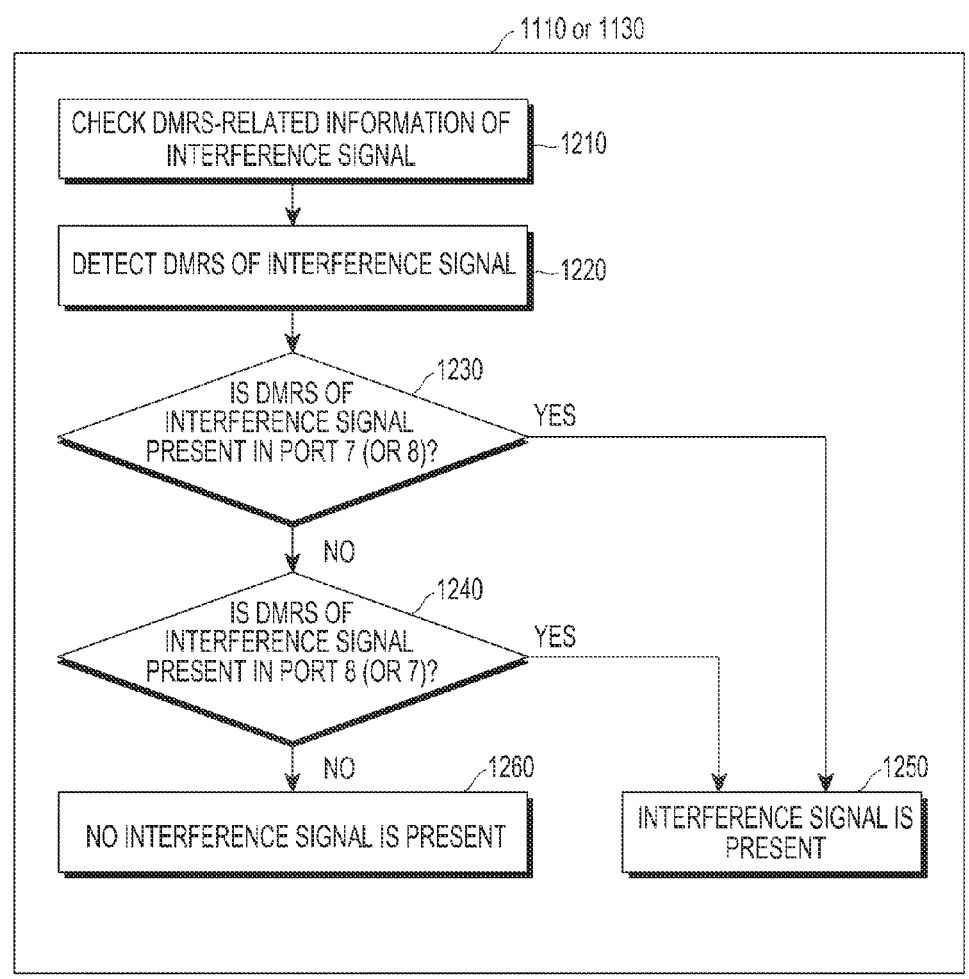
FIG. 12 illustrates a detailed operation of checking a presence/absence of a demodulation reference signal (DMRS)-based physical downlink shared channel (PDSCH) interference signal by a UE according to an embodiment of the present disclosure.

FIG. 12 illustrates a detailed operation required in a process of checking the presence/absence of a DMRS-based PDSCH interference signal in operation in FIG. 11A or operation in FIG. 11B by a UE according to an embodiment of the present disclosure.

Referring to FIG. 12, in an operation 1110 in FIG. 11A or operation 1130 in FIG. 11B an operation 1210 is performed, where the UE may check DMRS-related information in the information about an interference signal, which is checked in operation 910. The DMRS-related information may include at least one of a parameter required to generate a DMRS sequence and information about the number of CSI-RS antenna ports. For example, if TM is TM8 or TM9, the parameter required to generate a DMRS sequence may include a physical Cell ID (CID), a slot number and a scrambling ID, which are required to generate an initial sequence in Equation 3.

$$c_{init}=(\lfloor n_s/2 \rfloor+1)\cdot(2N_{ID}^{cell}+1)\cdot 2^{16}+n_{SCID} \quad \text{Equation 3}$$

where $n_s$ denotes a slot number, $N_{ID}^{cell}$ denotes a cell ID, and SCID denotes a scrambling ID, and $n_{SCID}$ may have a value of 0 or 1.

As another example, in the case of TM10, the parameter required to generate a necessary DMRS sequence may include a virtual cell ID, a slot number and a scrambling ID, which are required to generate an initial sequence in Equation 4.

$$c_{init}=(\lfloor n_s/2 \rfloor+1)\cdot(2n_{ID}^{(nSCID)}+1)\cdot 2^{16}+n_{SCID} \quad \text{Equation 4}$$

where $n_{ID}^{(nSCID)}$ denotes a virtual cell ID, which may be provided to the UE by upper layer signaling.

After checking the DMRS-related information of an interference signal, the UE may perform DMRS detection for the interference signal in operation 1220.

The present disclosure proposes a channel estimation process that uses DMRS, as a method of performing DMRS detection for an interference signal. However, the method of detecting DMRS of an interference signal will not be limited to the following method.

Information about the number (1, 2, 4 or 8) of CSI-RS antenna ports for an interference signal may be utilized for interference DMRS-based channel estimation. More specifically, since DMRS is allocated to an antenna port of p=7, p=8, or p=7, 8, etc., v+6 as described above, it is possible to determine the presence/absence of interference by simply checking the antennal port of p=7 or p=8. If the number of CSI-RS antenna ports for an interference signal is 4 or less, it is possible to detect a received signal existing in each antenna port of p=7 and p=8, by applying OCC of a Spreading Factor-2 (SF-2) for each slot as shown in Table 3.

TABLE 3

| Antenna port p | In the first slot $[\bar{w}_p(0)\ \bar{w}_p(1)]$ | In the second slot $[\bar{w}_p(2)\ \bar{w}_p(3)]$ |
|---|---|---|
| 7 | [+1 +1] | [+1 +1] |
| 8 | [+1 −1] | [+1 −1] |

If the number of CSI-RS antenna ports for an interference signal is 8 or less, it is also possible to detect a received signal existing in each antenna port of p=7 and p=8, by applying OCC of SF-4 for each subframe as shown in Table 4.

TABLE 4

| Antenna port p | In one subframe $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |

First, the UE may detect a received signal of an antenna port of p=7 or p=8, from a signal received at a DMRS position, by applying OCC in Table 3 or Table 4. A received signal of RE corresponding to the DMRS position at an antenna port of p=7 or p=8 may be expressed as shown in Equation 5.

$$y=X_s h_s + X_I h_I + n \quad \text{Equation 5}$$

where $X_s$ and $X_I$ are diagonal matrixes representing DMRS (i.e., serving DMRS) transmitted to the UE and interference DMRS, respectively, and $h_s$ and $h_I$ are vectors representing a channel component of a signal transmitted to the UE and a main channel component of an interference signal, respectively. In addition, n represents components of a received noise of the UE and the rest interference signals, and may be modeled as a probability variable having an independent Gaussian distribution. In this case, the UE may receive a transmission parameter for a desired signal from the serving cell, and estimate information $X_s$ and $h_s$ related to the desired signal. Therefore, if the UE may remove the signal (e.g., a serving signal or a desired signal) transmitted to the UE, from the received signal, Equation (5) may be rewritten as Equation 6.

$$\tilde{y}=y-X_s h_s = X_I h_I + n \quad \text{Equation 6}$$

The UE may perform DMRS detection for an interference signal as shown in Equation 6.

The UE may calculate $X_I$ by generating a DMRS sequence $C_{init}$ of an interference signal based on the slot number, scrambling ID, cell ID or virtual cell ID, which are obtained in operation 1210, and estimate a channel $h_I$ for an interference signal using the generated DMRS sequence of the interference signal. In this case, a channel estimation method such as Least Square (LS) or Minimum Mean Square Error (MMSE) may be applied.

One method in which the UE may detect DMRS of an interference signal in a channel estimation process that uses a DMRS sequence may include a method of performing power detection by coherently combining (CC) the values that are obtained through channel estimation on the assumption that channel values of REs corresponding to the DMRS positions are all the same. As another method, a method in which the UE performs MMSE channel estimation, sets a theoretically obtained Mean Square Error (MSE) as a threshold value and compares the channel estimation result with the threshold value, may be taken into consideration. In other words, in operation 1220, the UE may determine the presence/absence of interference by comparing the channel estimation value for the resources corresponding to DMRS with the power detection or threshold value.

In operations 1230 and 1240, the UE may determine the presence/absence of an interference signal based on the DMRS detection results for the interference signal in operation 1220.

If it is determined that there is interference in one of an antenna port of p=7 or an antenna port of p=8, the UE may determine in operation 1250 that there is a DMRS-based PDSCH interference signal. Operations 1230 and 1240 are processes of determining the presence/absence of a DMRS-based interference signal in an antenna port of p=7 and an antenna port of p=8, respectively. The order of antenna ports that are checked in operations 1230 and 1240 are subject to change. For example, the UE may determine an antenna port of p=8 in operation 1230, and an antenna port of P=7 in operation 1240.

If it is determined in both operations 1230 and 1240 that there is no interference, the UE may determine in operation 1260 that there is no DMRS-based PDSCH interference signal.

The channel information about the antenna port of p=7 or p=8, which is obtained in the process of detecting a DMRS-based PDSCH interference signal in FIG. 12 may be utilize in the channel estimation process that is performed in operations 940 and 950.

Figure 13:
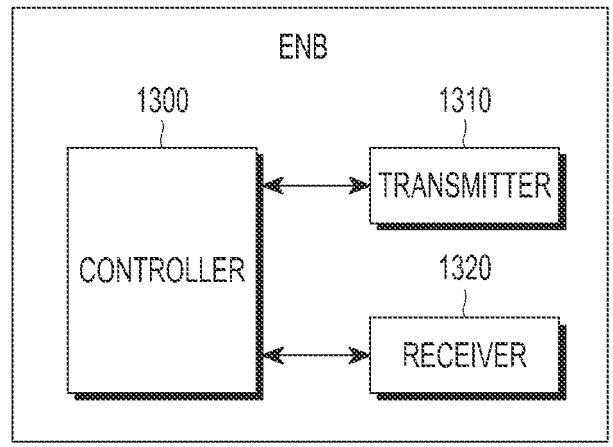
FIG. 13 illustrates a device configuration of an evolved Node B (eNB) according to an embodiment of the present disclosure.

FIG. 13 illustrates a device configuration of an eNB for supporting performance improvement of a UE receiver using interference cancellation and suppression method according to an embodiment of the present disclosure.

Referring to FIG. 13, a controller 1300 of the eNB may determine some or all of setting of an interfering cell for a particular UE, setting of a transmission parameter for an interfering cell, which is to be delivered to the UE, PDSCH scheduling, a subframe on which the CSI-RS, CRS information, downlink bandwidth (or the total number of RBs), and PRS may be transmitted, and MBSFN subframe information.

The transmission parameters of an interfering cell for the UE, which are determined by controller 1300, may be notified to the UE using a transmitter 1310. Depending on the PDSCH scheduling determination by the controller 1300, the control information and PDSCH may be transmitted to the UE by the transmitter 1310.

In addition, the controller 1300 may receive channel status information for PDSCH transmission and PDSCH scheduling for the UE, using a receiver 1320.

Figure 14:
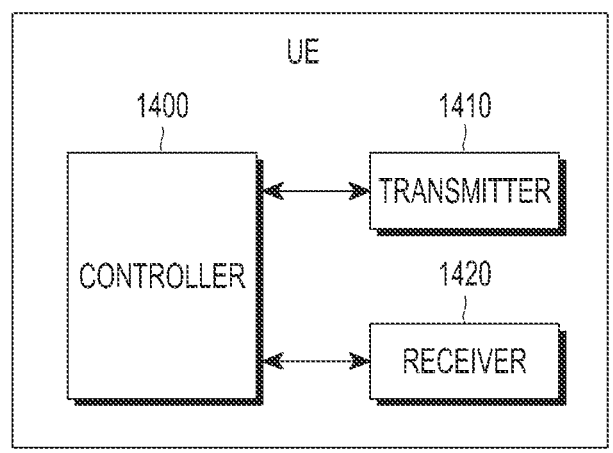
FIG. 14 illustrates a device configuration of a UE according to an embodiment of the present disclosure.

FIG. 14 illustrates a device configuration of a UE configured by considering interference cancellation and suppression proposed according to an embodiment of the present disclosure.

Referring to FIG. 14, a controller 1400 of the UE may receive control information about transmission parameter setting of an interfering cell from the eNB using a receiver 1420, and determine a control channel region of the interfering cell. The controller 1400 may determine which wireless resources it will use to measure an interference channel and perform blind detection, and determine a possible set of RI and PMI information for blind detection. The controller 1400 may perform blind detection, and perform decoding through interference cancellation and suppression. In addition, the controller 1400 may determine scheduling information of PDSCH from the control information that the receiver 1420 has received. The controller 1400 may include a decoder (not shown) for receiving the PDSCH through the receiver 1420 and decoding the PDSCH.

It should be noted that the resources, the data reception method, the method of checking the presence/absence of interference signal information, the method of determining the presence/absence of an interference signal, the method of checking the presence/absence of a DMRS-based interference signal, the configuration of the eNB and the configuration of the UE, which are illustrated in FIGS. 8, 9, 10, 11A, 11B, 12, 13, and 14, are not intended to limit the scope of the present disclosure. In other words, all the components or operations described in FIGS. 8 to 14 should not be construed to be essential components for implementation of the present disclosure, and the present disclosure may be implemented only with some of the components without departing from the subject matter of the present disclosure.

The above-described operations may be realized by mounting a memory device storing the program code in any components of an eNB or a UE of the communication system. In other words, a controller of the eNB or the UE may perform the above-described operations by reading and running the program code stored in the memory device by means of a processor or a Central Processing Unit (CPU).

Various components and modules of the eNB or the UE, which have been described herein, may be operated using a hardware circuit (e.g., Complementary Metal Oxide Semiconductor (CMOS)-based logic circuit), firmware, software and/or a hardware circuit such as a combination of hardware, firmware and/or software inserted in a machine-readable medium. For example, various electrical structures and methods may be implemented using electrical circuits such as transistors, logic gates and Application-Specific Integrated Circuit (ASIC).

As is apparent from the foregoing description, the method and apparatus according to the present disclosure may effectively determine whether to apply NAILS.

In addition, the method and apparatus according to the present disclosure may more accurately determine TM of an interference signal and LLR that is used for signal decoding, and may increase the decoding performance of a UE.

In other words, a UE employing NAICS technology may accurately and effectively check information about an interference signal, so the UE may provide improved mobile communication services through interference cancellation and suppression.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving downlink data in a wireless communication system, the method comprising:
   checking, by a user equipment (UE), a transmission parameter related to data transmitted from an interfering cell;
   determining, by the UE, whether a demodulation reference signal (DMRS)-based interference signal is present or not based on the transmission parameter;
   determining, by the UE, whether a cell specific reference signal (CRS)-based interference signal is present or not based on the transmission parameter, if the DMRS-based interference signal is not present;
   determining, by the UE, whether to apply network assisted interference cancellation and suppression (NAICS) technology based on at least one of the transmission parameter or whether the interference signal is present or not;
   decoding, by the UE, the downlink data depending on whether to apply the NAICS technology;
   generating a DMRS sequence using the transmission parameter; and
   calculating a log likelihood ratio (LLR) by applying the NAICS to remove the interference signal, or calculating a LLR by considering the interference signal,
   wherein the DMRS-based interference signal is determined to be present or not with respect to an antenna port whose port number p is 7 or 8, and
   wherein the downlink data is decoded using the calculated LLR.

2. The method of claim 1, wherein the checking of the transmission parameter comprises:
   receiving information including the transmission parameter from a serving cell through signaling, or blind-detecting the information including the transmission parameter.

3. The method of claim 1,
   wherein the transmission parameter includes enhanced physical downlink control channel (ePDCCH) information of the interfering cell, and
   wherein the determining of whether to apply the NAICS based on the transmission parameter comprises determining not to apply the NAICS, if the ePDCCH information of the interfering cell indicates that a control channel of the interference signal is set as an ePDCCH.

4. The method of claim 1,
   wherein the transmission parameter includes a physical downlink shared channel (PDSCH) transmission mode of the interfering cell, and
   wherein the determining of whether to apply the NAICS based on the transmission parameter comprises determining not to apply the NAICS, if the PDSCH transmission mode of the interfering cell includes a specific transmission mode.

5. The method of claim 1,
   wherein the transmission parameter includes a physical downlink shared channel (PDSCH) transmission mode of the interfering cell,
   wherein the determining of whether to apply the NAICS based on the transmission parameter comprises determining to apply the NAICS, if the PDSCH transmission mode of the interfering cell includes a specific transmission mode, and
   wherein the specific transmission mode is a CRS-based transmission mode or a DMRS-based transmission mode.

6. The method of claim 1, wherein the determining of whether the DMRS-based interference signal is present or not comprises:
   determining whether the DMRS-based interference signal is present or not, if the checked transmission parameter does not include a PDSCH transmission mode of the interfering cell.

7. The method of claim 1, wherein the determining of whether to apply the NAICS based on whether the interference signal is present or not comprises determining to apply the NAICS, if the DMRS-based interference signal is present.

8. The method of claim 1, further comprising:
   estimating a channel of the DMRS-based interference signal using the generated DMRS sequence,
   wherein the DMRS-based interference signal is determined to be present or not with respect to the antenna port whose port number p is 7 or 8 based on the estimated channel.

9. The method of claim 1, wherein the LLR is calculated by a conditional probability density function in which statistical characteristics of the interference signal are reflected.

10. The method of claim 1, wherein the transmission parameter includes at least one of port number information of the interfering cell, a physical cell identifier (ID), a virtual cell ID, a scrambling ID, a transmission mode of a physical downlink shared channel (PDSCH), enhanced physical downlink control channel (ePDCCH) information, slot number information, or information about a number of antenna ports.

11. A user equipment (UE) for receiving downlink data in a wireless communication system, the UE comprising:
   a controller configured to:
      check a transmission parameter related to data transmitted from an interfering cell,
      determine whether a demodulation reference signal (DMRS)-based interference signal is present or not based on the transmission parameter,
      determine whether a cell specific reference signal (CRS)-based interference signal is present or not based on the transmission parameter, if the DMRS-based interference signal is not present,
      determine whether to apply network assisted interference cancellation and suppression (NAICS) technology based on at least one of the transmission parameter or whether the interference signal is present or not,
      decode the downlink data depending on whether to apply the NAICS technology,
      generate a DMRS sequence using the transmission parameter, and
      calculate a log likelihood ratio (LLR) by applying the NAICS to remove the interference signal, or calculate a LLR by considering the interference signal; and
   a receiver configured to receive the downlink data under control of the controller,
   wherein the DMRS-based interference signal is determined to be present or not with respect to an antenna port whose port number p is 7 or 8, and
   wherein the downlink data is decoded using the calculated LLR.

12. The UE of claim 11, wherein the controller is further configured to receive information including the transmission parameter from a serving cell through signaling, or blind-detect the information including the transmission parameter.

13. The UE of claim 11,
wherein the transmission parameter includes enhanced physical downlink control channel (ePDCCH) information of the interfering cell, and
wherein the controller is further configured to determine not to apply the NAICS, if the ePDCCH information of the interfering cell indicates that a control channel of the interference signal is set as an ePDCCH.

14. The UE of claim 11,
wherein the transmission parameter includes a physical downlink shared channel (PDSCH) transmission mode of the interfering cell, and
wherein the controller is further configured to determine not to apply the NAICS, if the PDSCH transmission mode of the interfering cell includes a specific transmission mode.

15. The UE of claim 11,
wherein the transmission parameter includes a physical downlink shared channel (PDSCH) transmission mode of the interfering cell,
wherein the controller is further configured to determine to apply the NAICS, if the PDSCH transmission mode of the interfering cell includes a specific transmission mode, and
wherein the specific transmission mode is a CRS-based transmission mode or a DMRS-based transmission mode.

16. The UE of claim 11, wherein the controller is further configured to determine whether the DMRS-based interference signal is present or not, if the checked transmission parameter does not include a PDSCH transmission mode of the interfering cell.

17. The UE of claim 11, wherein the controller is further configured to apply the NAICS, if the DMRS-based interference signal is present.

18. The UE of claim 11,
wherein the controller is further configured to estimate a channel of the DMRS-based interference signal using the generated DMRS sequence, and
wherein the DMRS-based interference signal is determined to be present or not with respect to the antenna port whose port number p is 7 or 8 based on the estimated channel.

19. The UE of claim 11, wherein the LLR is calculated by using a conditional probability density function in which statistical characteristics of the interference signal are reflected.

20. The UE of claim 11, wherein the transmission parameter includes at least one of port number information of the interfering cell, a physical cell identifier (ID), a virtual cell ID, a scrambling ID, a transmission mode of the physical downlink shared channel (PDSCH), enhanced physical downlink control channel (ePDCCH) information, slot number information, or information about the number of antenna ports.

* * * * *